United States Patent [19]

King

[11] Patent Number: 4,526,958

[45] Date of Patent: Jul. 2, 1985

[54] PARTICLE FORM EVAPORATION START-UP

[76] Inventor: William R. King, c/o Phillips Petroleum Company, Bartlesville, Okla. 74004

[21] Appl. No.: 522,773

[22] Filed: Aug. 12, 1983

Related U.S. Application Data

[63] Continuation-in-part of Ser. No. 427,221, Sep. 29, 1982, abandoned.

[51] Int. Cl.³ .......................... C08F 6/00; C08C 4/00
[52] U.S. Cl. ...................................... 528/502; 34/10; 526/914; 528/503

[58] Field of Search ...................... 528/502, 503, 480; 34/10, 12

[56] References Cited

U.S. PATENT DOCUMENTS 4,263,091  4/1981  King ................................ 159/44
4,310,973  1/1982  King ................................ 34/10

Primary Examiner—Christopher A. Henderson

[57] ABSTRACT

A seed is supplied to a particle form evaporator to form a seed bed. The rate at which seed is supplied is controlled in response to the temperature of the seed bed. The seed bed can be used to facilitate start-up of the particle form evaporator. Apparatus useful for the inventive start-up process is also disclosed.

3 Claims, 2 Drawing Figures

PARTICLE FORM EVAPORATION START-UP

The present application is a continuation-in-part of application Ser. No. 427,221, filed Sept. 29, 1982, now abandoned, by the present inventor.

My invention relates to particle form evaporation. In one aspect my invention relates to the start-up of particle form evaporators. In another aspect my invention relates to a seed system for particle form evaporators. In yet another aspect, my invention relates to an alternative seed system for particle form evaporators. In yet another aspect, my invention relates to apparatus suitable for use in the above seed systems.

BACKGROUND

Particle form evaporation is described in U.S. Pat. Nos. 4,310,973 and 4,263,091 and in two U.S. patent applications (Ser. Nos. 426,433 and 427,220) filed on the same day as the parent of this application. W. R. King is named as the sole inventor in one application. W. R. King and R. E. Elliott are the co-inventors named in the other application. The above-identified patents and applications are incorporated by reference herein. The reader is encouraged to consult and study these sources of information to facilitate a comprehensive and thorough understanding of my present invention.

In brief summary particle form evaporation involves the evaporation of solvent or liquid from a polymer. This is accomplished by introducing a polymer-containing solution or a mixture of polymer and liquid into an agitated bed of hot polymer particles. The hot agitated bed, typically contained in a cylindrical vessel, facilitates evaporation of solvent or liquid. The introduced polymer upon agitation and drying assumes a particle form and replaces other dry polymer particles in the bed which are removed as the product of the process.

Agitation is typically accomplished by positioning within the vessel containing the polymer particle bed a mechanical agitation means such as, for example, rotating mixer blades. The term blade is intended to be broadly construed and includes, for example, paddles, rods, pins, etc. Agitation of the bed causes an input of energy into the system which heats the polymer particles. For good results the bed should be heated to a temperature of at least about the boiling point of the solvent or liquid. The heat can be supplied by agitation alone or in combination with other sources of heat such as, for example, a hot gas directed through the bed or a heating jacket positioned around the bed.

The feed (polymer solution or polymer-liquid mixture) can be introduced into the bed in any of many ways. For example the feed can be sprayed into the bed if the feed is sufficiently fluid. A less fluid feed such as, for example, one premixed with filler can be extruded into the bed. Many other methods of feed introduction are within the scope of this invention and the capability of those of ordinary skill in the art.

Particle form evaporation is not limited to any particular polymer and the scope of this invention should be interpreted accordingly. We note, however, that the process is especially well suited for the recovery of dry rubbery polymer such as, for example, styrene-butadiene copolymer from a rubbery polymer solution (as produced in a solution polymerization process) or from a rubbery polymer-containing latex (as produced in an emulsion polymerization process).

A problem encountered in the practice of the particle form evaporation process is that of start-up. Without a bed of hot agitated particles ready to receive the feed, the feed builds up in the system without adequate evaporation of solvent or liquid.

SUMMARY OF THE INVENTION

In accordance with my invention a seed is supplied to a particle form evaporator to build up an agitated bed of hot particles before introduction of polymer solution or polymer-liquid mixture into the bed. The seed is comprised of solid particles. The rate at which seed is supplied to the particle form evaporator can be regulated in response to the temperature of the bed. Further in accordance with my invention, apparatus suitable for use in the buildup of an agitated bed of hot particles in a particle form evaporator is provided.

OBJECTS OF THE INVENTION

It is an object of my invention to provide an improved particle form evaporation process and system.

It is another object of my invention to improve the efficiency of particle form evaporation start-up.

These objects and other objects and advantages of my invention will be apparent upon a study of this disclosure and the appended claims.

DETAILED DESCRIPTION OF THE INVENTION

Figure 1:
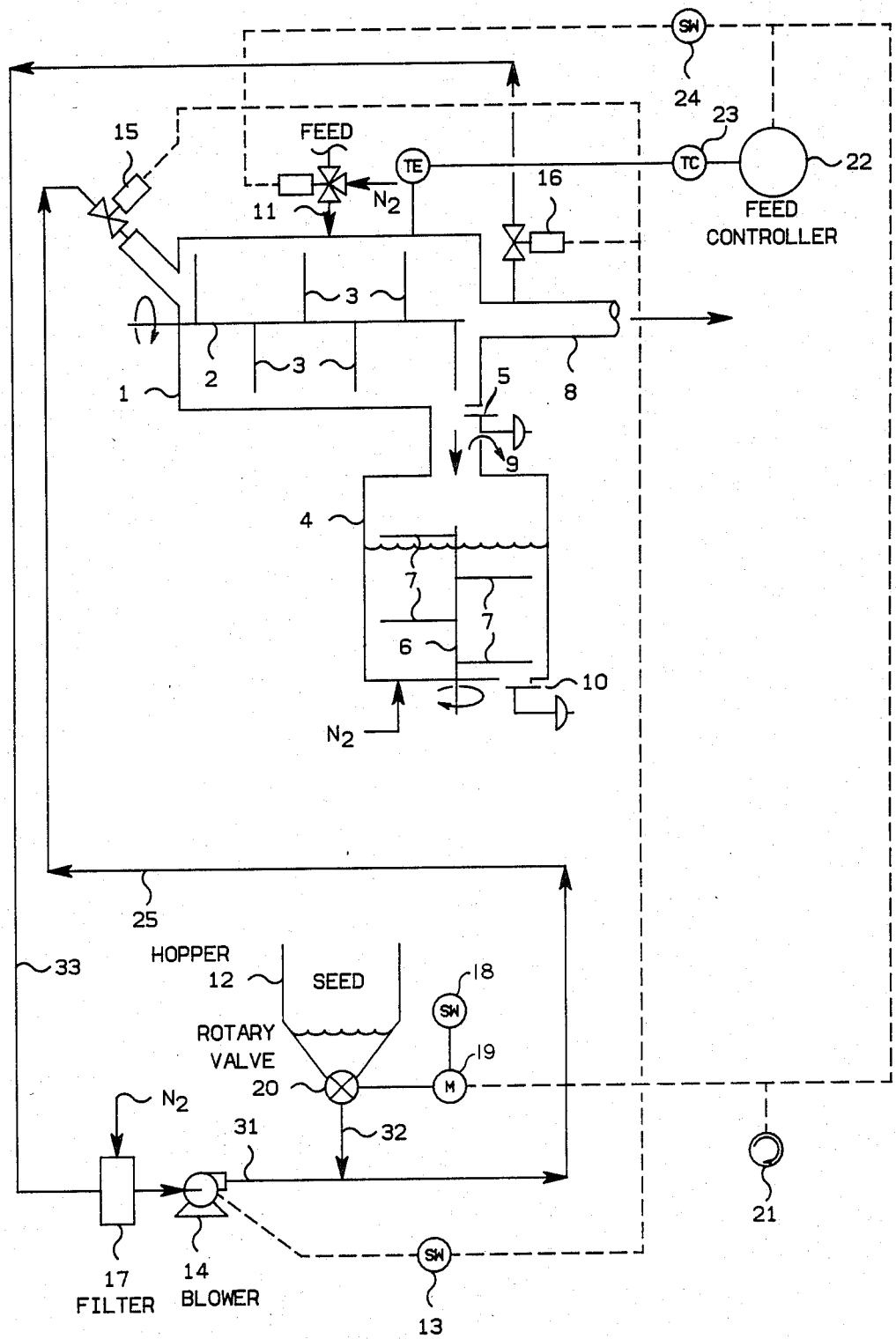
FIG. 1 depicts a start-up system for a particle form evaporator.

Because it is not practical to start introduction of feed (i.e. polymer solution or polymer-liquid mixture) until a bed of hot particles is established in the particle form evaporator I have invented a process and apparatus for establishing a start-up bed. In accordance with my invention a seed comprising solid particles is passed to the particle form evaporator to build up a bed of hot seed particles in the vessel.

The solid seed particles can be of any solid material. It is preferred, however, that the seed be comprised of the same type of polymer that is to be introduced into the particle form evaporator as part of the feed. This is preferred because it reduces the complexity of the process and the possibility of contamination. Other materials that can be used as seed include, by way of nonlimiting example, polymers not similar in type to the polymer in the feed, sand, fillers, polyethylene pellets, etc. The seed particles can be formed by grinding, pelleting or otherwise processing the material to obtain small units.

The seed, once in the bed, provides resistance to the agitation means. This resistance generates heat within the bed. For best operation of the particle form evaporator the seed particle bed must be heated up to a temperature of at least about the boiling point of the solvent or liquid to be evaporated. Lower temperatures can be used but this will necessitate longer residence times in the particle form evaporator. To protect the product it is generally desired to maintain the temperature of the bed below about that point at which significant thermal degradation of the polymer will occur.

In addition to the heat generated by mechanical agitation of the seed particle bed, heat can optionally be supplied to the bed by passing a hot gas into the bed, by positioning a heating jacket around the bed-containing vessel or otherwise supplying an additional source of heat to the bed.

The seed can be fed into the particle form evaporator from a source such as, for example, a hopper or other container. Alternatively, seed can be fed into the particle form evaporator from the secondary unit, as described below in greater detail. For efficient operation after an initial bed has been built up the rate at which seed is fed into the particle form evaporator is controlled in response to the temperature of the bed. The control system illustrated in FIGS. 1 and 2 and explained below is an example of how this procedure can be implemented. A rate should be established such that the temperature of the bed is at least high enough to effect evaporation of solvent or liquid when introduced with the feed. It is preferred, for good evaporation, that the temperature of the bed be at least about the boiling point of the solvent or liquid. The rate at which seed is fed into the particle form evaporator should also be sufficiently high such that the temperature of the bed does not reach a point at which substantial thermal degradation of the polymer occurs.

In an embodiment of this invention the formation of the seed bed (i.e. the bed of solid particles) in the particle form evaporator is begun by introducing into the particle form evaporator seed at a rate independent of temperature. After the bed has been sufficiently built up, such that the bed temperature can be sensed by the means chosen for that purpose, the rate of seed introduction is controlled in response to that temperature. Seed introduction can be accomplished by any suitable means, such as gravity flow or mechanical transporting means such as a blower.

FIG. 1 depicts one embodiment of my invention. The particle form evaporator 1 is a cylindrical vessel, the axis of rotation of which is horizontally aligned. Positioned within the vessel is a mechanical agitation means comprised of an axially aligned shaft 2 and blades 3 attached thereto. The shaft 2 is rotated by a motor (not shown). Rotation of the shaft 2 drives the blades 3 and causes agitation of the particle bed (when present).

A secondary unit 4 is positioned below the particle form evaporator 1 to receive polymer particles that fall through the opening created by gate 5. The secondary unit is a cylindrical vessel, the axis of rotation of which is vertically aligned. $N_2$ (or some other inert gas) is passed through the unit 4 to aid removal of residual solvent or liquid from the dried polymer particles. Polymer which falls into the secondary unit forms a second bed which is agitated by a second agitation means. This second agitation means is comprised of a shaft 6 and blades 7 attached thereto. The shaft 6 is rotated by a motor (not shown) Rotation of the shaft 6 drives the blades 7 and causes agitation of the second bed.

Evaporated solvent or liquid is removed from the system through conduit 8 or at 9. The dried polymer product is removed through the opening created by gate 10.

Before operation begins both the particle form evaporator 1 and the secondary unit 4 are empty of feed and particles. It is desired to build up a bed of hot particles in the particle form evaporator 1 before the feed is introduced through introduction means 11 into the particle form evaporator 1.

Seed is supplied to and stored in a hopper 12. The seed can be particles of any material. It can be, for example, sand or polymer. For the purposes of this illustration the seed is comprised of dry, ground or pelleted, styrene-butadiene copolymer.

The mechanical agitators in the particle form evaporator 1 and in the secondary unit 4 are running even though the vessels are empty. The entire system is filled with an inert gas such as $N_2$ to displace air. Switch 13 is activated to start blower 14 and to open valves 15 and 16. This establishes a flow of $N_2$ (introduced through the filter 17) into conduit 31 which flow continues through the conduit 25 used to feed seed into the particle form evaporator 1 and through the conduit 33 which returns effluent gases from the particle form evaporator 1 through filter 17 to the blower 14.

Having established this $N_2$ flow a rotary valve motor switch 18 is activated to turn on a motor 19 which drives a rotary valve 20. The rotary valve 20 and the blower 14 are interlocked so that the rotary valve won't turn unless the blower is on. A minimum speed regulator 21 controls the motor 19 such that the rotary valve 20 is rotated at a minimum speed to begin feeding seed through conduit 32 into the conduit 25. The seed is blown through valve 15 into the particle form evaporator 1 where build-up of the particle bed begins. Note that because of the rotating blades the speed bed forms against the wall of the vessel. The bed provides resistance to the rotation of the blades which in turn causes the input of heat into the bed.

After a bed has been at least partially built within the particle form evaporator 1 control switches from 21 to a feed controller 22. The feed controller 22 in normal operation (i.e. after start-up) is used to regulate the input of feed through introduction means 11 but during start-up is used to regulate the amount of seed fed into the particle form evaporator 1. The temperature within the particle bed is sensed by a temperature sensing means (such as, for example, a thermocouple) positioned in the particle form evaporator 1. The temperature is used by a temperature controller 23 to regulate the feed controller 22. In this manner the rate at which seed is fed into the particle form evaporator is regulated in response to the temperature of the bed.

Valve 5 is actuated in response to the load on the motor (not shown) that drives the rotation of shaft 2. On start-up with the motor unloaded (i.e. no particle bed) valve 5 is closed. If the rate at which seed is fed into the bed is too high then the seed will not have time to heat up to the desired temperature before the motor is loaded and seed is dumped through opening valve 5. Recall that the temperature of the bed should be at least about the boiling point of the solvent or liquid in the feed to be introduced through 11 after start-up. If the rate at which seed is fed into the bed is too low then the load on the motor will be built up slowly, the residence time of the particles in the bed will be too long (because valve 5 will not open until the load has built up) and the bed will overheat. The bed overheats if it reaches a temperature sufficiently high to cause significant thermal degradation of the polymer in the feed to be introduced through 11 after start-up. Accordingly, the seed is fed into the particle form evaporator at a rate such that the bed temperature is maintained within the desired range (i.e. at least about the boiling point of the solvent or liquid but not above the thermal degradation point of the polymer).

Seed discharged from the secondary unit 4 can be recycled to the hopper 12.

Once the bed is built up and the desired temperature is established in the particle form evaporator 1 and a second particle bed in the secondary unit 4 is built up (sufficient to cover the polymer outlet opening at gate 10) the system is ready to receive the feed through introduction means 11. At this point switch 13 is turned off and feed switch 24 is turned on. Valves 15 and 16 close automatically so that vapors will not enter the seed system. The feed, regulated by feed controller 22, is then introduced through 11 into the particle form evaporator 1. The rate at which feed is introduced can be controlled in response to the temperature of the particle bed.

Assuming that the polymer in the feed is a styrene-butadiene copolymer of the type used as seed then polymer can be immediately removed as product through gate 10. If the seed is a material other than the polymer in the feed and it is not desired to have such seed material combined with the dried polymer product then provision must be made to first separately collect the output through gate 10 until the seed is no longer present in the output.

Figure 2:
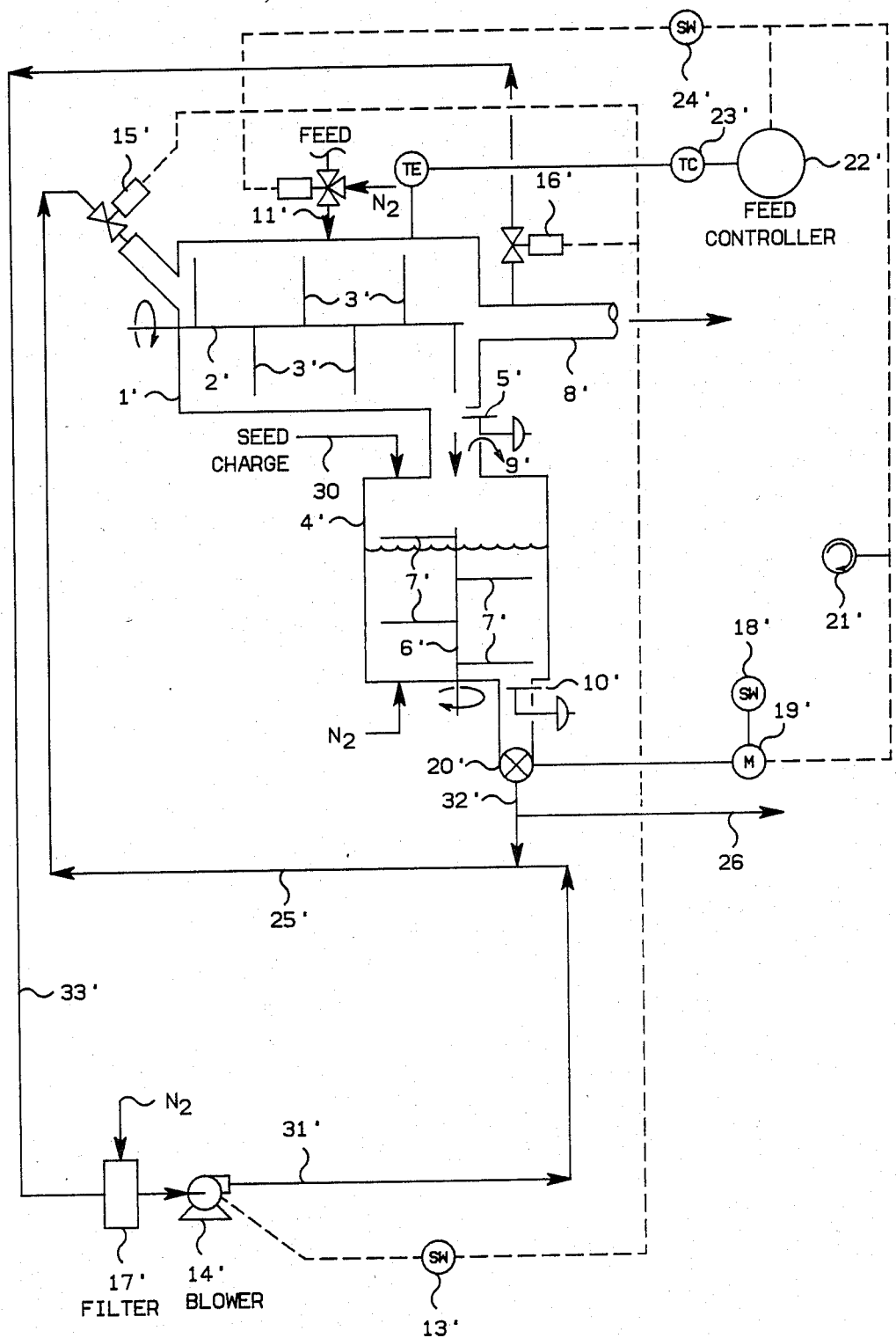
FIG. 2 depicts an alternate, start-up system for a particle form evaporator.

In FIG. 2 particle form evaporator 1', equipped with shaft 2', blades 3', gate 5', conduit 8', valve 15' and feed introduction means 11' is equivalent to the vessel described above with respect to FIG. 1.

Secondary unit 4', equipped with shaft 6' and blades 7', conduit 9' and gate 10' is similar to the vessel described above with respect to FIG. 1, except that secondary unit 4' is further provided with a seed charge means 30 and rotary valve 20'.

Before operation begins, the particle form evaporator 1' is empty of feed and particles. It is desired to build up a bed of hot particles in the particle form evaporator 1' before the feed is introduced through introduction means 11' into the particle form evaporator 1'.

Seed is supplied to secondary unit 4' via seed charge means 30. The seed can be particles of any material. It can be, for example, sand or polymer. For the purposes of this illustration the seed is comprised of dry, ground or pelleted, styrene-butadiene copolymer.

The mechanical agitators in both the particle form evaporator 1' and in the secondary unit 4' are running even though the particle form evaporator 1' is empty. The entire system is filled with an inert gas such as $N_2$ to displace air. Switch 13' is activated to start blower 14' and to open valves 15' and 16'. This establishes a flow of $N_2$ (introduced through the filter 17') into conduit 31' which flow continues through the conduit 25' used to feed seed into the particle form evaporator 1' and through the conduit 33' which returns effluent gases from the particle form evaporator 1' through filter 17' to the blower 14'.

Having established this $N_2$ flow a rotary valve motor switch 18' is activated to turn on a motor 19' which drives a rotary valve 20'. The rotary valve 20' and the blower 14 are interlocked so that the rotary valve won't turn unless the blower is on. A minimum speed regulator 21' controls the motor 19' such that the rotary valve 20' is rotated at a minimum speed to begin feeding seed through conduit 32' into the conduit 25'. The seed is blown through valve 15' into the particle form evaporator 1' where build-up of the particle bed begins. Note that because of the rotating blades the seed bed forms against the wall of the vessel. The bed provides resistance to the rotation of the blades which in turn causes the input of heat into the bed.

After a bed has been at least partially built within the particle form evaporator 1' control switches from 21' to a feed controller 22'. The feed controller 22' in normal operation (i.e. after start-up) is used to regulate the input of feed through introduction means 11' but during start-up is used to regulate the amount of seed fed into the particle form evaporator 1'. The temperature within the particle bed is sensed by a temperature sensing means (such as, for example, a thermocouple) positioned in the particle form evaporator 1'. The temperature is used by a temperature controller 23' to regulate the feed controller 22'. In this manner the rate at which seed is fed into the particle form evaporator is regulated in response to the temperature of the bed.

Valve 5' is actuated in response to the load on the motor (not shown) that drives the rotation of shaft 2'. On start-up with the motor unloaded (i.e. no particle bed) valve 5' is closed. If the rate at which seed is fed into the bed is too high then the seed will not have time to heat up the desired temperature before the motor is loaded and seed is dumped through opened valve 5'. Recall that the temperature of the bed should be at least about the boiling point of the solvent or liquid in the feed to be introduced through introduction means 11' after start-up. If the rate at which seed is fed into the bed is too low then the load on the motor will be built up slowly, the residence time of the particles in the bed will be too long (because valve 5' will not open until the load has built up) and the bed will overheat. The bed overheats if it reaches a temperature sufficiently high to cause significant thermal degradation of the polymer in the feed to be introduced through 11' after start-up. Accordingly, the seed is fed into the particle form evaporator at a rate such that the bed temperature is maintained within the desired range (i.e. at least about the boiling point of the solvent or liquid but not above the thermal degradation point of the polymer).

Evaporated solvent or liquid is removed from the system through conduit 8' or at 9'. The dried polymer product is removed through the opening created by gate 10' and collected via product recovery line 26 through a diverter valve (not shown).

Assuming that the polymer in the feed is a styrene-butadiene copolymer of the type used as seed then polymer can be immediately removed as product through gate 10' and collected via product recovery line 26. If the seed is a material other than the polymer in the feed and it is not desired to have such seed material combined with the dried polymer product then provision must be made to first separately collect the output through gate 10' (via line 26) until the seed is no longer present in the output.

Seed discharged from the secondary unit 4' through line 26 can be recycled to the secondary unit 4' through seed charge means 30 where a prolonged start-up procedure is required.

Once the bed is built up and the desired temperature is established in the particle form evaporator 1' and so long as a second particle bed in the secondary unit 4' sufficient to cover the polymer outlet opening at gate 10' remains, the system is ready to receive the feed through introduction means 11'. At this point switch 13' is turned off and feed switch 24' is turned on. Valves 15' and 16' close automatically so that vapors will not enter the start-up system. The feed, regulated by feed controller 22', is then introduced through feed introduction means 11' into the particle form evaporator 1'. The rate at which feed is introduced can be controlled in response to the temperature of the particle bed.

This embodiment of my invention is especially useful where the polymer in the feed and the polymer used as seed are the same.

I claim:

1. A method for startup of a particle form evaporation process, said method comprising:
   (a) introducing a first portion of seed into a first vessel at a rate independent of temperature to form an initial seed bed within said first vessel,
   (b) mechanically agitating said initial seed bed,
   (c) sensing the temperature of the agitated seed bed, and
   (d) controlling the rate at which additional seed is introduced into the agitated seed bed in response to the temperature of the agitated seed bed;
   wherein the seed comprises solid particles and is comprised of the same type of polymer that is to be introduced into the particle form evaporator is part of the feed; and
   wherein the temperature of the seed bed is maintained at a temperature of at least the boiling point of the solvent or liquid to be evaporated but below that point at which significant thermal degradation of the polymer will occur.

2. A process as recited in claim 1 wherein said seed is introduced into said first vessel from a second vessel which is in direct communication therewith via both introduction and discharge means of said first vessel.

3. A method as recited in claim 1 further comprising (e) introducing a feed into said first vessel after said seed bed has been established; wherein said feed comprises a member selected from the group consisting of (i) a solution comprising polymer and solvent and (ii) a mixture comprising polymer and liquid.

* * * * *

UNITED STATES PATENT AND TRADEMARK OFFICE
CERTIFICATE OF CORRECTION

PATENT NO. : 4,526,958

DATED : July 2, 1984

INVENTOR(S) : William R. King

It is certified that error appears in the above-identified patent and that said Letters Patent is hereby corrected as shown below:

The term of this patent subsequent to January 19, 1999 has been disclaimed.

Signed and Sealed this

Twelfth Day of November 1985

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,526,958

DATED : July 2, 1985

INVENTOR(S) : William R. King

It is certified that error appears in the above-identified patent and that said Letters Patent are hereby corrected as shown below:

Claim 1, column 8, line 1, please delete "is" and insert therefor ---as---.

Signed and Sealed this

Fifth Day of August 1986

[SEAL]

Attest:

DONALD J. QUIGG

Attesting Officer

Commissioner of Patents and Trademarks